United States Patent [19]

Herring, Sr.

[11] Patent Number: 4,981,428

[45] Date of Patent: Jan. 1, 1991

[54] APPARATUS FOR MOLDING SLOTTED CONCRETE FLOOR SECTIONS

[76] Inventor: William T. Herring, Sr., P.O. Box 308, Newton Grove, N.C. 28366

[21] Appl. No.: 337,177

[22] Filed: Apr. 12, 1989

[51] Int. Cl.[5] .............................................. B29C 39/26

[52] U.S. Cl. .................................... 425/253; 249/124; 249/142; 249/163; 249/165; 249/167; 249/177

[58] Field of Search ................. 249/35, 122, 124, 142, 249/155, 156, 163, 165, 142, 177, 122, 124, 147, 176; 425/253, 167

[56] References Cited

U.S. PATENT DOCUMENTS

| | | | |
|---|---|---|---|
| 408,213 | 8/1889 | Carter | 249/147 |
| 793,539 | 6/1905 | Pettyjohn | 249/147 |
| 894,744 | 7/1908 | Phillips | 249/155 |
| 1,460,232 | 6/1923 | Ditto | 249/142 |
| 1,525,000 | 2/1925 | Schuster | 249/122 |
| 1,579,042 | 3/1926 | Watkins | 249/122 |
| 1,642,980 | 9/1927 | Turner | 249/122 |
| 1,651,215 | 11/1927 | Masztics | 249/122 |
| 2,240,776 | 5/1941 | Henderson | 249/122 |
| 2,276,558 | 3/1942 | Zuber | 249/176 |
| 3,915,422 | 10/1975 | Nobbe | 249/142 |
| 3,977,646 | 8/1976 | Moon et al. | 249/139 |
| 3,982,874 | 9/1976 | Nobbe | 425/88 |
| 4,119,691 | 10/1978 | Nobbe | 264/71 |
| 4,168,820 | 9/1979 | Nobbe | 249/142 |
| 4,228,985 | 10/1980 | Gaudelli et al. | 249/122 |
| 4,348,344 | 9/1982 | Nobbe | 249/122 |

*Primary Examiner*—Willard Hoag

*Attorney, Agent, or Firm*—Bell, Seltzer, Park and Gibson

[57] ABSTRACT

This invention relates to an apparatus for molding slotted concrete floor sections. The apparatus forms the concrete floor sections in an inverted position so as to avoid the need for hand finishing of the upper surface of the molded concrete floor sections. The apparatus comprises a base, opposing pairs of interconnected upstanding side and end walls connected to the base and a plurality of elongate spaced apart and substantially parallel ridges connected to and projecting upwardly from the base. Attached to and overlying the ridges are a plurality of elongate keystone shaped dividers removably mounted on and extending upwardly from the ridges with the upper surface being in a substantially common plane with the upper surfaces of the side and end walls. The dividers are attached to the apparatus by downwardly extending connector means which extend through holes in the ridges to a force applying means positioned below the base and operatively associated with the connecting means for supplying a downward force from below the base of the apparatus.

20 Claims, 4 Drawing Sheets

APPARATUS FOR MOLDING SLOTTED CONCRETE FLOOR SECTIONS

FIELD OF THE INVENTION

This invention relates to a molding apparatus for molding slotted concrete floor sections such as are commonly used for floors in pig houses for the raising of pigs and hogs and more particularly to a molding apparatus which eliminates the need for hand finishing of the upper surface of the molded concrete floor sections.

BACKGROUND OF THE INVENTION

It is current practice to raise pigs and other livestock in houses to optimize growth and fattening up of the animals. These houses typically have a concrete floor with narrow slots therethrough which allow excrement and other waste to fall through the floor to a trough. This provides the pigs with a cleaner environment and reduced exposure to disease and infection. The slots are generally narrow along the upper surface and wider near the bottom to reduce potential clogging of the slots. The waste may be collected in the trough for subsequent use such as fertilizer, etc. The concrete floor comprises a series of floor sections which are molded at a remote location and are placed side by side to form a floor with a continuous grid of equally spaced slots.

Conventional apparatus for molding each floor section is a mold or form having dividers in the shape of the slots extending upright from the base of the mold. Concrete is poured into the mold and the top surface is continuously worked and smoothed over a period of time to form a smooth upper surface. This is very labor intensive and requires substantial time, effort and skill to obtain the desired finish.

To avoid the extensive labor costs involved in working the upper surface of the concrete, U.S. Pat. Nos. 3,915,422, 3,982,874, 4,119,691 and 4,168,820 to Nobbe disclose mold arrangements for producing the concrete slotted floor sections in an inverted orientation. The base of the mold provides the top of the floor section with a smooth surface without the costly hand working and smoothing of the surface. The bottom of the floor section, which is upward in the mold should be leveled, but does not need to be smoothed like the upper surface. Thus there is a reduction in labor costs for forming the floor sections.

The Nobbe patents, however, have not produced a fully satisfactory arrangement for molding the floor sections. The Nobbe apparatus is a lightweight wooden apparatus producing smaller than conventional sized floor sections. This design would not be suitable for repeated or continuous commercial use for conventional sized floor sections without extensively strengthening and rigidifying the design. For example, the upright dividers are mounted to a series of cross supports which hold the dividers down to the base of the mold. In a conventional size, the cross support would extend approximately twice the span shown by Nobbe. After repeated use, the weight of the concrete pushing upwardly against the dividers may weaken the cross supports and allow a space to form between the base of the mold and the divider. This space would naturally get filled with concrete and the molded floor section would therefore have slots which are closed. Such floor sections are unsatisfactory and must be discarded as waste. Clearly, the cost of such wasted floor sections would be expensive.

Accordingly it is an object of the present invention to provide a molding apparatus for molding slotted concrete floor sections in an inverted position and which is constructed to withstand repeated commercial use and includes means for effectively holding the dividers down to the base of the mold and avoid the problems of the prior art as noted above.

SUMMARY OF THE INVENTION

The above and other objects of the present invention have been achieved by the provision of a molding apparatus comprising a base and opposing pairs of interconnected upstanding side and end walls connected to the base. Further connected to the base and projecting upwardly therefrom are a plurality of elongate, spaced apart and substantially parallel ridges arranged in substantially parallel relation to the opposing pair of side walls. A plurality of elongate keystone shaped dividers are removably mounted on and extending upwardly from the ridges with the upper surfaces of the dividers being in a substantially common plane with the upper surfaces of the side and end walls. Each divider is arranged so that the narrower portion thereof is lowermost and in overlying engagement with each respective ridge. The dividers are secured in the overlying engagement with each respective ridge by securing means so as to prevent concrete from flowing between the proximal surfaces of the dividers and respective ridges. The securing means includes connector means connected to and extending downwardly from the narrower lower portion of each divider through a respective ridge therebelow and through and beyond the base. A force applying means is operatively associated with the connector means for applying a downward force to the connector means so as to in turn apply a downward force to the dividers against the ridges.

BRIEF DESCRIPTION OF THE DRAWINGS

Some of the objects of the invention have been stated and other objects will appear as the description proceeds when taken in conjunction with the accompanying drawings in which.

DETAILED DESCRIPTION OF THE PREFERRED EMBODIMENT

Figure 1:
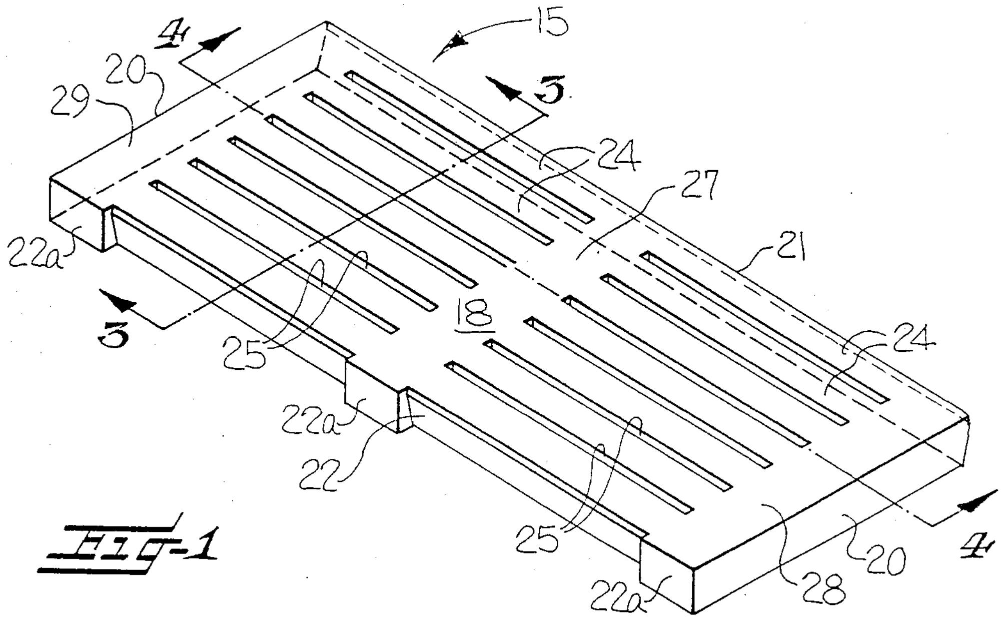
FIG. 1 is a top perspective view of a molded concrete floor section.
Figure 2:
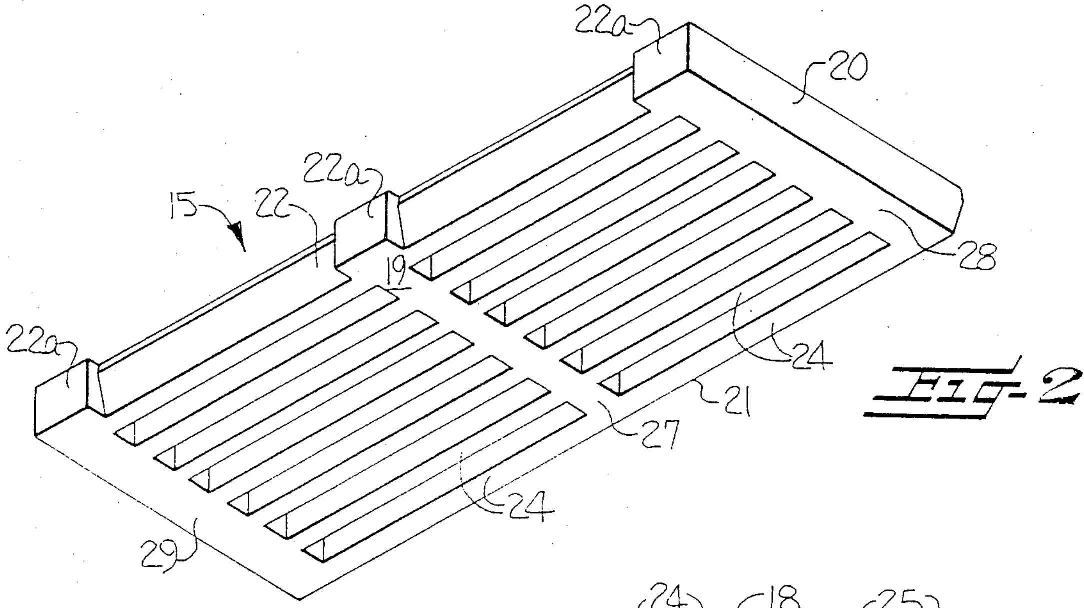
FIG. 2 is a bottom perspective view of the molded concrete floor section.
Figure 3:
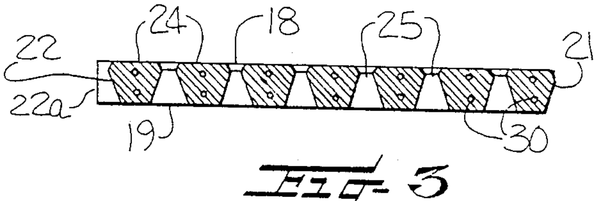
FIG. 3 is a transverse section view taken along line 3—3 in FIG. 1.
Figure 4:
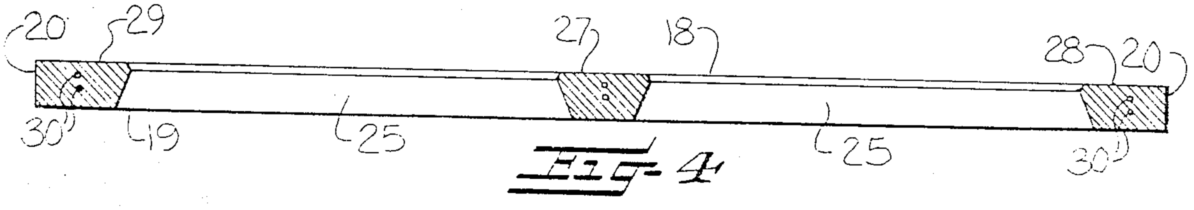
FIG. 4 is a longitudinal section view taken along line 4—4 in FIG. 1.
Figure 5:
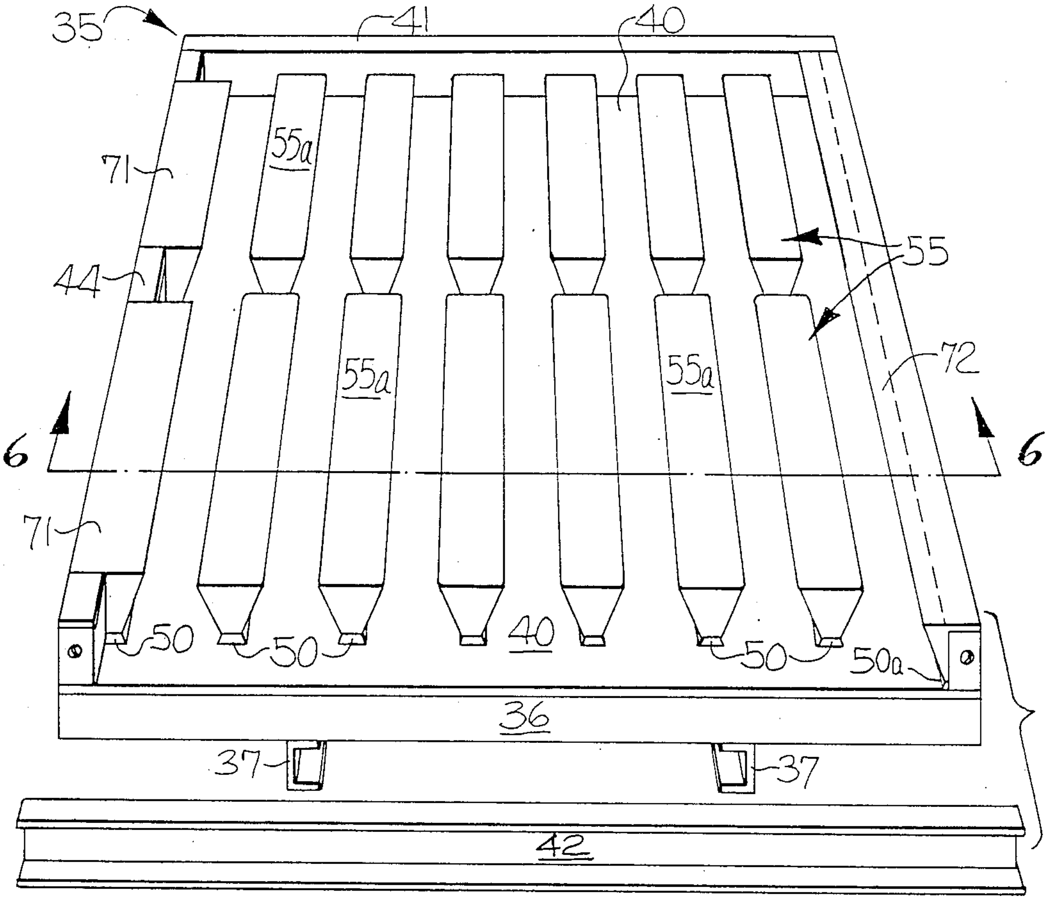
FIG. 5 is a top perspective view, partially exploded, of the molding apparatus for molding the concrete floor section which embodies the features of the present invention.

Referring more particularly to the drawings, FIGS. 1—4 illustrate a preferred embodiment of a molded concrete floor section 15. Such floor sections 15 are designed to be placed side-by-side for the building of an extensive floor in a livestock house such as used for the raising of pigs or hogs. The floor sections 15 are generally flat and rectangular, with a length up to approximately four times its width. The floor sections have a smooth upper surface 18 and a parallel bottom surface 19 so as to lay flat during the construction and use in the livestock house. The individual floor sections 15 have opposite ends 20 and opposed elongate edges 21 and 22. The floor sections 15 further include a plurality of elongate concrete slats 24 which define slots 25 therebetween. The slots 25 allow excrement, waste, and other debris to fall through the floor to a pit or trough (not shown) for subsequent collection and use. The slots 25, as best seen in FIGS. 3 and 4, flare out in a diverging shape from the upper surface 18 down to the bottom surface 19 so as to limit the possibility of debris clogging the slots 25.

The slots 25 are preferably formed as two groups in opposite halves of the floor section wherein one group is in general alignment with the other group. The slats 24 are also formed as two corresponding groups wherein the slats 24 extend from solid end wall portions 28 and 29 to a solid intermediate wall portion 27. The solid intermediate and end wall portions 27, 28, and 29 therefore define the ends of the slats 24 and slots 25. The intermediate wall portion 27 also separates the two groups of slots and slats. The slats 24 and the solid wall portions 27, 28, and 29 further include metal reinforcing bars 30 embedded therein to provide additional strength for the floor sections 15.

The molded floor sections 15 are further designed so that as two sections are positioned beside each other to form a floor, a slot is formed between the two floor sections. The slot at the juncture is preferably equally spaced in relation to the other slots 25 formed in each of the floor sections 15. The slot at the juncture should also have the same characteristics as the slots within the floor sections 15, such as a similar size and diverging shape. In particular, the elongate edge 21 (FIG. 3) of the floor section 15 has a continuous undercut which forms one side of the divergingly shaped slot. The opposite elongate edge 22 is formed with outwardly offset portions 22*a* defining the ends of the intermediate and side wall portions 27, 28, and 29. The offset portions 22*a* serve as spacers to define the width of the slots 25 at the juncture of adjacent floor sections 15. The slat 24 adjacent the edge 22 is also undercut similar to the opposite edge 21 so as to form the complimentary portion of the slot at the juncture of the two floor sections 15. By having the offset portions 22*a* along one edge of the floor sections 15, and a continuous undercut along the Opposite edge, there is less margin for error for the slot at the juncture of adjacent floor sections 15.

It is conventional to make such floor sections in standard sizes so as to easily be laid to form a continuous floor of much larger size. Such standard sizes range from four to twelve feet long and two to six feet wide. The sections are also generally about six to ten inches thick although these dimensions may vary significantly depending on the intended use or a particular design need.

Referring now to FIGS. 5—8, the apparatus for molding such slotted concrete floor sections which embodies the features of the present invention is generally indicated by the numeral 35. The molding apparatus 35 comprises a flat base 40 which is preferably made of steel or other strong material. Transverse base supporting members 36 such as steel I-beams or channel beams may be secured by welding to the underside of the base 40 to provide additional rigidity for the apparatus 35. Longitudinal base supporting members 37 such as I-beams or channel beams may further be secured to the lower portions of transverse members 36. The spaced apart transverse beams 36 further define voids between the base 40 and the longitudinal beams 37 for receiving the forks of a forklift truck to facilitate handling of the molding apparatus 35. The flat base 40 should be relatively smooth since it defines the upper surface 18 of the floor section 15 as the floor section is cast in an inverted position within the apparatus 35. Pairs of interconnected upstanding steel side and end walls 41, 42, 43, and 44 are connected to the base so as to define the dimension of the floor section, including the thickness thereof and the sides of the apparatus 35. When manufacturing the floor sections 15, the concrete poured into the apparatus 35 is smoothed to the level of the side and end walls 41, 42, 43, and 44 which thereby defines the thickness of the floor sections 15.

The molding apparatus 35 further comprises a plurality of elongate, spaced apart and substantially parallel steel ridges 50 connected to and projecting upwardly from the base 40. The ridges 50 are provided in substantially parallel relation to the opposing pair of side walls 43 and 44 and define the upper portions of the slots 25 in the floor sections 15. The ridges 50 further include holes 51 (FIG. 8) adjacent the end portions thereof and which extend through the ridges 50 and downwardly through the base 40. A plurality of elongate hollow steel dividers 55 are removably mounted on the ridges 50 and extend upwardly therefrom to define a substantial portion of the divergingly shaped slots 25. Each of the dividers 55 are keystone shaped so as to have a larger upper surface 55*a* compared to a narrower bottom surface 55*b* and so that the narrower bottom surface 55*b* is lowermost and overlies each of the respective ridges 50. The upper surface 55*a* at the same time is arranged in a substantially common plane with the upper surfaces of the side and end walls 41, 42, 43, and 44. Therefore, the size of the dividers will further define the thickness of the floor sections 15. The dividers 55 further include downwardly extending connector means 59 for extending downwardly from the narrower bottom surface 55*b*. The connector means 59 are aligned with the holes 51 to extend down through the respective ridge 50 therebelow and through and beyond the base 40. The connector means 59 are elongate members which have the appearance of a bolt with an irregular or roughened outer surface. To anchor the connector means 59 in the dividers 55, locking nuts 59*a* are provided which are shown as being welded inside the dividers 55. The combination of the ridges 50 and the dividers 55 form the slots 25 in the floor sections 15 and define the side edges of the concrete slats 24.

The molding apparatus 35 further comprises means for securing each of the dividers 55 in overlying engagement with the respective ridges 50. The means for securing comprises the downwardly extending connector means 59 and releasable force applying means 60. The force applying means 60 is positioned below the base and arranged to engage the connector means 59 to provide a downwardly directed force on the dividers 55 to secure each of the dividers 55 firmly against the respective ridges 50.

The releasable force applying means 60, according to the preferred embodiment, comprises adjustable vice grip pliers 65 and jaw means 66. The pliers 65 include a pair of cooperating plier jaws 65*a* and the jaw means 66 comprises opposing angle bars connected to the plier jaws 65*a*. Each of the angle bars have an outwardly extending horizontal flange 66*a* and a downwardly extending vertical flange 66*b*.

Figure 10:
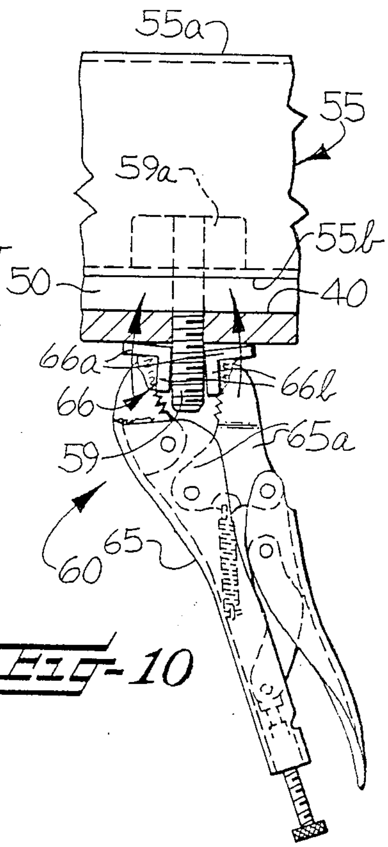
FIG. 10 is a fragmentary section view looking in the direction of arrow 10 in FIG. 9.
Figure 11:
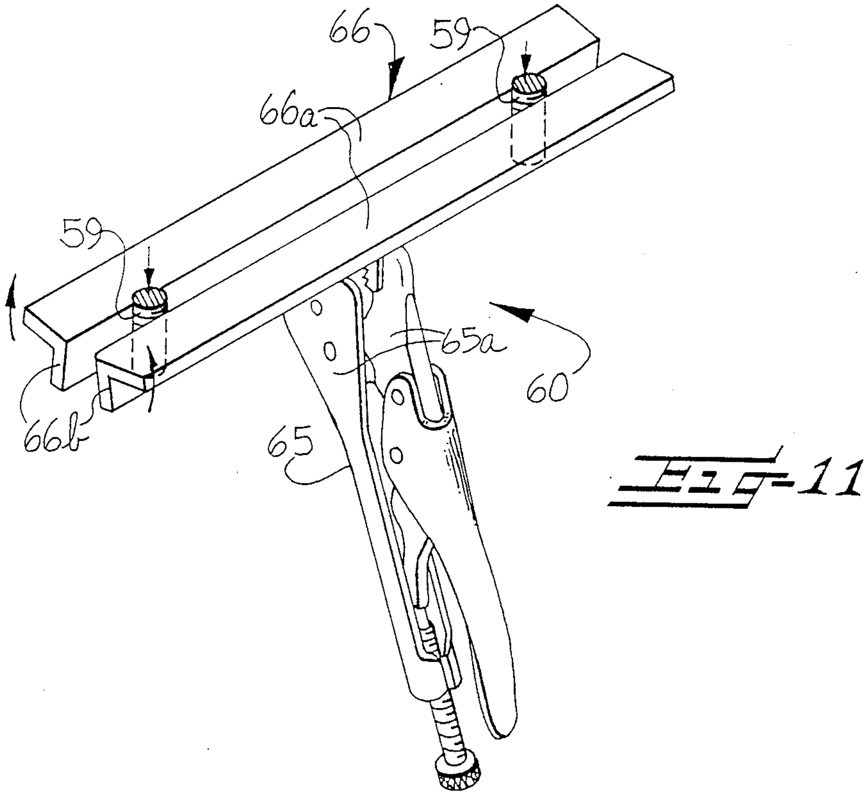
FIG. 11 is a fragmentary top perspective view of the force applying means gripping a pair of connector means.

The vertical flanges 66*b* of the jaw means 66 are preferably welded to the jaws of the pliers 65 and grip the irregular outer surface of the connector means 59 with a lever type pulling action as best shown in FIG. 10. The lever type pulling action applies substantial downward force on the connector means 59 by using the base 40 as an abutment surface. More particularly, as best shown in FIGS. 10 and 11, the outwardly extending horizontal flanges 66*a* of the jaw means 66 press against the base 40 and draw the connector means 59 downwardly and in turn apply downward force to the dividers 55 for effecting firm engagement of the dividers with the ridges 50. By this tight engagement, concrete in the mold is therefore prevented from flowing between the proximal surfaces of the dividers 55 and the respective ridges 50 which would block the slots 25 in the floor section 15. The jaw means 66 is preferably sufficiently long to extend across two adjacent dividers 55 to grip the connector means 59 extending downwardly from both dividers. Therefore, the number of force applying means 60 is approximately the same number as the number of dividers 55.

The molding apparatus 35 further comprises special molding surfaces to form the edges 21 and 22 of the floor sections 15. Particularly the apparatus 35 has two longitudinally spaced apart segmental dividers 71 aligned with each other and overlying ridges 50 positioned adjacent side wall 44. One side wall of the segmental dividers is square and vertical to fit up against the side wall 44. These segmental dividers 71 are somewhat more than one half the cross section of dividers 55 and form the complimentary portions of the slots at the edge 22 of the floor section 15. The segmental dividers 71 also form the outwardly offset portions 22*a* along edge 22. At the other side 43 of the apparatus 35 is a long angled divider 72 which is somewhat less than one half the cross section of dividers 55. The long divider 72 is positioned adjacent to the wall 43 to overlie a long divider 50*a* and to extend the full length of the wall 43 so as to provide the continuous undercut along the edge 22 of the floor section 15.

Figure 9:
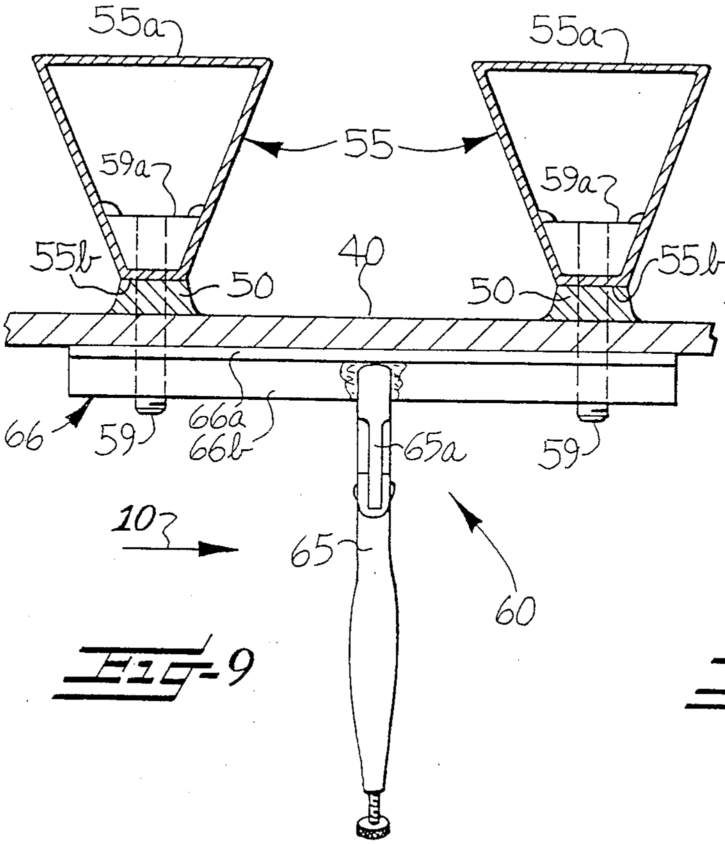
FIG. 9 is an enlarged fragmentary transverse section view similar to FIG. 6, particularly illustrating the means for securing each of the dividers in the molding apparatus.

One particular feature of this invention is that the ridges 50 are desirably provided with inwardly tapered opposite side walls (FIG. 9). This provides wider upper openings for the slots 25, and avoids any sharp edges on the slats 24. The ridges 50 in combination with the dividers 55 further provide that the juncture between the two is positioned down within the slot 25 of the floor section 15. Therefore, if there is any slight misalignment between the proximal surfaces of the dividers 55 and the ridges 50 which would cause a rough edge in the concrete, the rough edge will be down in the slot 25 and away from the animals.

Figure 6:
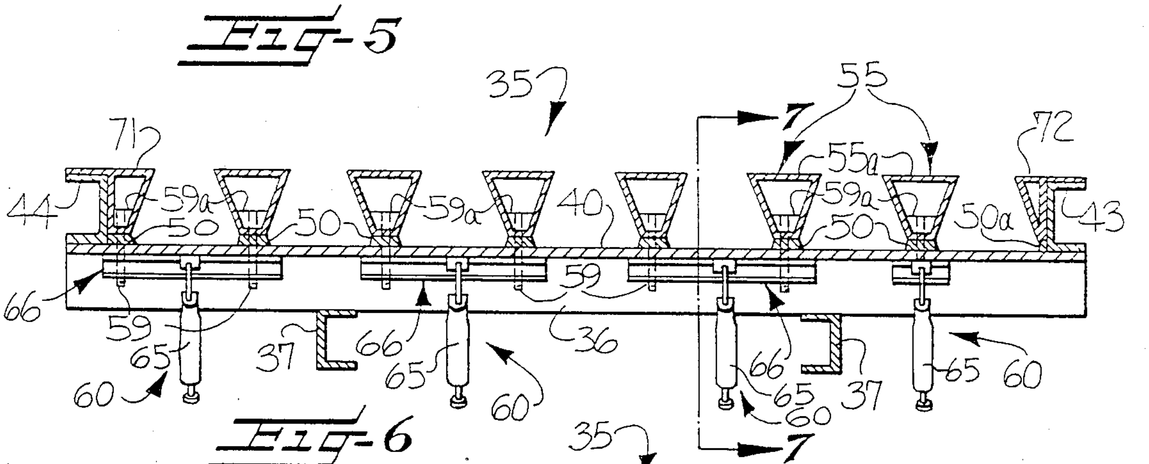
FIG. 6 is a transverse section view taken along line 6—6 in FIG. 5.
Figure 7:
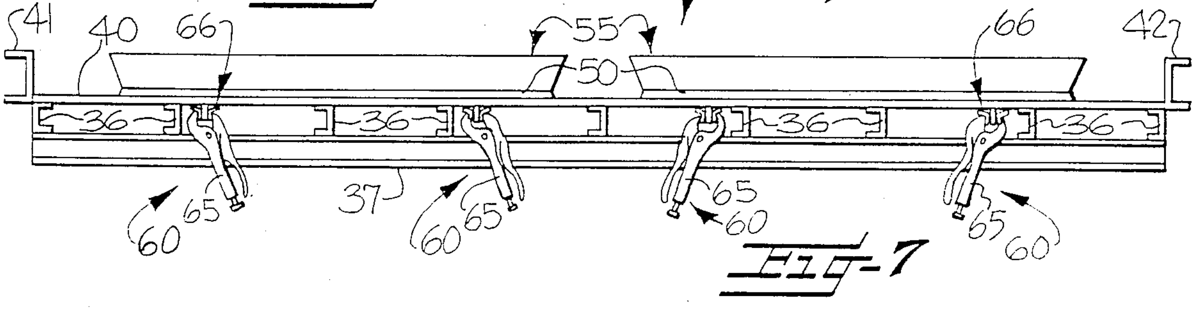
FIG. 7 is a longitudinal section view taken along line 7—7 in FIG. 6.
Figure 8:
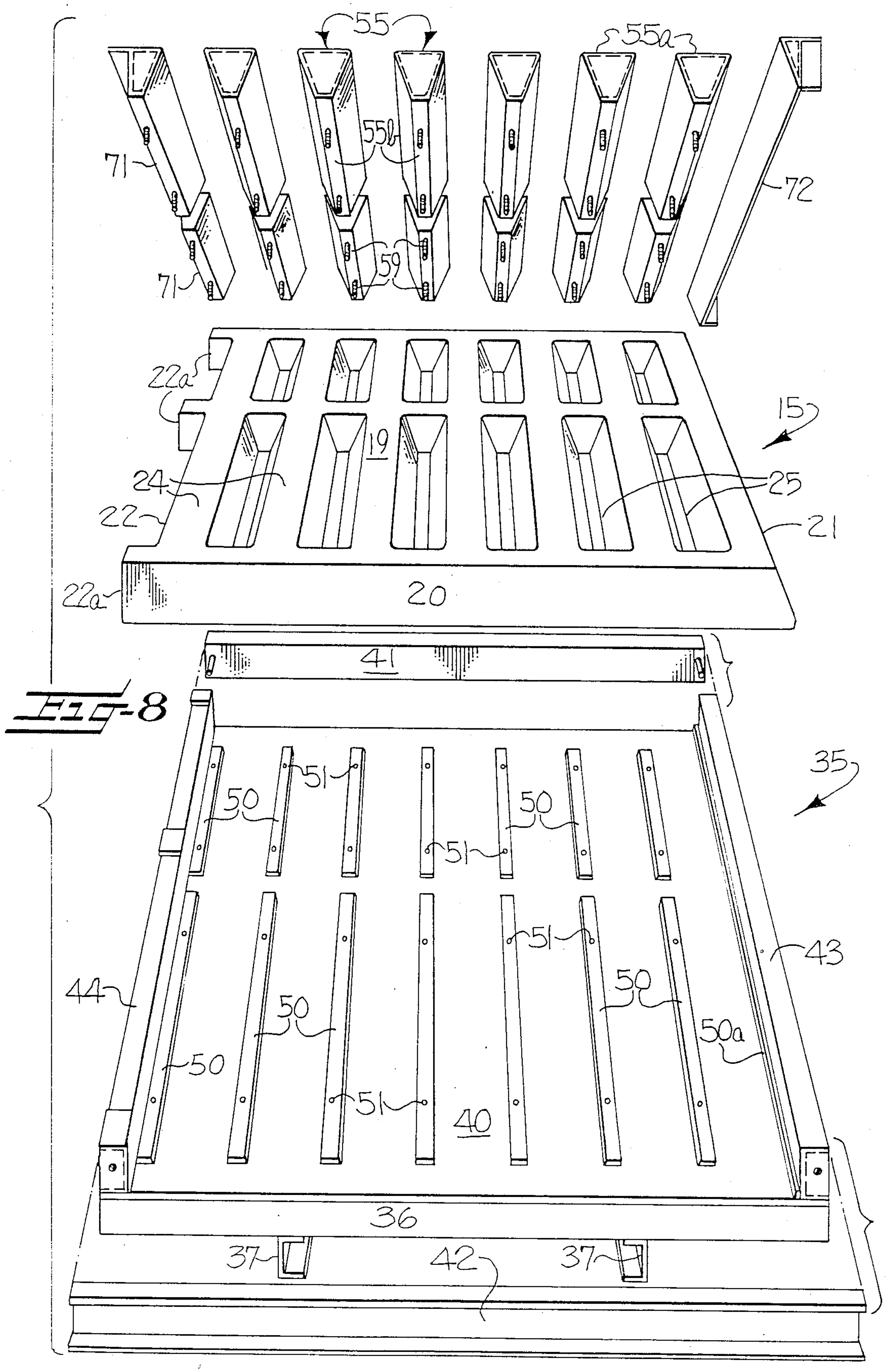
FIG. 8 is an exploded perspective view of the molded concrete floor section and the molding apparatus for molding the same.

In operation, the apparatus 35 is assembled as shown in FIGS. 6 and 7 wherein the dividers 55 are mounted on the ridges 50. The force applying means 60 secures the dividers 55 by gripping the connector means 59 extending downwardly through the holes 51. Suitable reinforcing bars 30 are placed in the apparatus and concrete is provided therein. The concrete is smoothed off at a level of the upper surfaces 55*a* of the keystone shaped dividers 55 and the side and end walls 41, 42, 43, and 44 of the apparatus 35 by any suitable means as is well known in the art. The apparatus 35 is then set off to the side to allow the concrete to cure. At a time when the concrete has sufficiently set, the force applying means 60 is released from the connector means 59 to permit removal of the dividers 55. The end walls 41 and 42 may be detached to further facilitate removal of the concrete slotted floor section 15 from the molding apparatus 35. Once the floor section 15 is removed, the molding apparatus 35 may be reassembled to mold another floor section 15. However, as noted earlier, the manufacturing operation does not necessitate the step of hand finishing the upper surface 18. From the foregoing it should be readily apparent that the molding apparatus of the present invention lends itself for use in providing economic molding of slotted concrete floor sections wherein the molding apparatus is constructed for obtaining slotted concrete floor sections of accurate and precise dimensions. The present invention further provides a molding apparatus which is rugged and durable and can withstand rough handling as is common in molding operations. Further the molding apparatus is adapted for being lifted and moved by a fork lift truck without bending or deforming so as to maintain the integrity of a concrete floor section which has not set.

In the drawings and specification there has been set forth a preferred embodiment of the invention, and although specific terms are employed they are used in a generic and descriptive sense only and not for purposes of limitation.

That which I claim is:

1. A molding apparatus for molding slotted concrete floor sections such as are commonly used in forming slotted floors for the raising of pigs, said apparatus being constructed for molding each floor section in an inverted position so as to avoid the need for hand finishing the upper surface of the molded concrete floor section, said apparatus comprising a base, means for supporting said base generally horizontally, opposing pairs of interconnected upstanding side and end walls connected to said base, a plurality of elongate, spaced apart and substantially parallel ridges connected to and projecting upwardly from said base in substantially parallel relation to said opposing pair of side walls, a plurality of elongate dividers removably mounted on and extending upwardly from said ridges with their upper surfaces being spaced apart from each other to form voids therebetween for receiving concrete therein, said upper surfaces of said dividers being in a substantially common plane with the upper surfaces of said side and end walls, said dividers being of generally keystone shape in cross section and serving for defining divergingly shaped slots in the concrete floor sections, the narrower portion of each divider being lowermost and in overlying engagement with each respective ridge, and means for securing each of said dividers in said overlying engagement with a respective ridge and for preventing concrete from flowing between the proximal surfaces of said dividers and respective ridges, said means including connector means connected to and extending downwardly from said narrower lower portion of each divider through a respective ridge therebelow and through and beyond said base, and force applying means positioned below said base and operatively associated with said connector means for quickly applying a downward force to said connector means so as to in turn apply a downward force to said dividers against said ridges.

2. A molding apparatus according to claim 1 wherein said connector means connected to and extending downwardly from said narrower lower portion of each divider comprises a plurality of downwardly extending elongate members extending beyond said base for accessible engagement by said force applying means.

3. A molding apparatus according to claim 1 wherein the areas of said base extending between said ridges are flat to form flat faced upper surfaces on the molded concrete floor sections completely devoid of any crown being present thereon.

4. The molding apparatus according to claim 1 wherein said upwardly projecting ridges include inwardly tapered opposite side walls so as to provide relatively wide upper openings for the slots in the concrete floor section.

5. A molding apparatus according to claim 1 wherein said ridges and said overlying dividers are each arranged in two corresponding groups with the ridges and dividers of one group being longitudinally aligned with the corresponding ridges and dividers of the other group and longitudinally spaced apart from the other group to allow concrete to flow between the two groups to form a solid intermediate wall portion in the molded concrete floor section between the two groups, said two groups also being spaced from said end walls to allow concrete to flow therebetween to form solid end wall portions in opposite ends of the molded concrete floor section, the outermost ridges and dividers along one side of each group being in contact with one of said mold side walls to define an outwardly offset intermediate solid wall portion and outwardly offset end wall portions in the molded concrete floor section, and the opposite side wall of the mold including a divider extending along the full length of the side wall of the mold so as to define a continuous undercut side edge portion in the molded concrete floor section devoid of any outwardly offset portion therealong.

6. The molding apparatus according to claim 1 wherein said means for supporting said base generally horizontally comprises a plurality of spaced apart rigid transverse base supporting members secured to lower portions of said base and extending transversely with respect to said apparatus, and a plurality of spaced apart rigid longitudinal base supporting members secured to lower portions of said transverse base supporting members and extending longitudinally with respect to said apparatus such that said spaced apart transverse base supporting members define voids between said base and said longitudinal base supporting members to receive the forks of a fork lift truck and facilitate the handling of said molding apparatus.

7. A molding apparatus according to claim 1 wherein said force applying means includes jaw means movable into and out of clamping engagement with said connector means.

8. A molding apparatus according to claim 7 wherein each of said connector means has an irregular surface cooperating with said jaw means.

9. The molding apparatus according to claim 7 wherein said force applying means comprises vice grip pliers having a pair of cooperating plier jaws, said jaw means comprising opposing angle bars connected to and carried by said plier jaws for engaging said connector means.

10. The molding apparatus according to claim 9 wherein each of said angle bars includes an outwardly extending horizontal flange and a downwardly extending vertical flange and wherein said horizontal flanges engage and press against said base as said vertical flanges move into clamping engagement with said connector means so as to draw the connector means downwardly and in turn apply downward force to said dividers for effecting firm engagement of the dividers with said ridges.

11. A molding apparatus of heavyweight construction for molding slotted concrete floor sections such as are commonly used in forming slotted floors for the raising of pigs, said apparatus being constructed for molding each floor section in an inverted position so as to avoid the need for hand finishing the upper surface of the molded concrete floor section, said apparatus comprising a steel base, means for supporting said base generally horizontally, opposing pairs of interconnected upstanding steel side and end walls connected to said base, a plurality of elongate, spaced apart and substantially parallel steel ridges connected to and projecting upwardly from said base in substantially parallel relation to said opposing pair of side walls, a plurality of elongate hollow dividers formed of steel and removably mounted on and extending upwardly from said ridges with their upper surfaces being spaced apart from each other to form voids therebewteen for receiving concrete therein, said upper surfaces of said dividers being in a substantially common plane with the upper surfaces of said side and end walls, said dividers being of generally keystone shape in cross section and serving for defining divergingly shaped slots in the concrete floor sections, the narrower portion of each divider being lowermost and in overlying engagement with each respective ridge, and means for securing each of said dividers in said overlying engagement with a respective ridge and for preventing concrete from flowing between the proximal surfaces of said dividers and respective ridges, said means including connector means connected to an extending downwardly from said narrower lower portion of each divider through a respective ridge therebelow and through and beyond said base, and releasable force applying means positioned below said base and operatively associated with said connector means for quickly applying a downward force to said connector means so as to in turn apply a downward force to said dividers against said ridges.

12. The molding apparatus according to claim 11 wherein said means for supporting said base generally horizontally comprises a plurality of spaced apart rigid transverse base supporting members secured to lower portions of said base and extending transversely with respect to said apparatus, and a plurality of spaced apart rigid longitudinal base supporting members secured to lower portions of said transverse base supporting members and extending longitudinally with respect to said apparatus such that said spaced apart transverse base supporting members define voids between said base and said longitudinal base supporting members to receive the forks of a fork lift truck and facilitate the handling of said molding apparatus.

13. A molding apparatus according to claim 11 wherein said connector means connected to and extending downwardly from said narrower lower portion of each divider comprises a plurality of downwardly extending elongate and press against said base as said vertical flanges move into clamping engagement with said connector means so as to draw the connector means downwardly and in turn apply downward force to said dividers for effecting firm engagement of the dividers with said ridges.

14. A molding apparatus according to claim 11 wherein the areas of said base extending between said ridges are flat to form flat faced upper surfaces on the molded concrete floor sections completely devoid of any crown being present thereon.

15. The molding apparatus according to claim 11 wherein said upwardly projecting ridges include inwardly tapered opposite side walls so as to provide wider upper openings for the slots in the concrete floor section.

16. A molding apparatus according to claim 11 wherein said ridges and said overlying dividers are each arranged in two corresponding groups with the ridges and dividers of one group being longitudinally aligned with the corresponding ridges and dividers of the other group and longitudinally spaced apart from the other group to allow concrete to flow between the two groups to form a solid intermediate wall portion in the molded concrete floor section between the two groups, said two groups also being spaced from said end walls to allow concrete to flow therebetween to form solid end wall portions in opposite ends of the molded concrete floor section, the outermost ridges and dividers along one side of each group being in contact with one of said mold side walls to define an outwardly offset intermediate solid wall portion and outwardly offset end wall portions in the molded concrete floor section, and the opposite side wall of the mold including a divider extending along the full length of the side wall of the mold so as to define a continuous undercut side edge portion in the molded concrete floor section devoid of any outwardly offset portion therealong.

17. A molding apparatus according to claim 11 wherein said force applying means includes jaw means movable into and out of clamping engagement with said connector means.

18. A molding apparatus according to claim 17 wherein each of said connector means has an irregular surface cooperating with said jaw means.

19. The molding apparatus according to claim 17 wherein said force applying means comprises vice grip pliers having a pair of cooperating plier jaws, said jaw means comprising opposing angle bars connected to and carried by said plier jaws for engaging said connector means.

20. The molding apparatus according to claim 19 wherein each of said angle bars includes an outwardly extending horizontal flange and a downwardly extending vertical flange and wherein said horizontal flanges engage and press against said base as said vertical flanges move into clamping engagement with said connector means so as to draw the connector means downwardly and in turn apply downward force to said dividers for effecting firm engagement of the dividers with said ridges.

* * * * *